(12) United States Patent
Lee

(10) Patent No.: US 7,187,943 B1
(45) Date of Patent: Mar. 6, 2007

(54) APPARATUS FOR IMPROVING CALL TRANSITION EFFICIENCY IN A WIRELESS COMMUNICATION SYSTEM

(75) Inventor: Anthony S. Lee, San Diego, CA (US)

(73) Assignee: VIA Telecom Co., Ltd, San Diego, CA (US)

( * ) Notice: Subject to any disclaimer, the term of this patent is extended or adjusted under 35 U.S.C. 154(b) by 511 days.

(21) Appl. No.: 10/269,523

(22) Filed: Oct. 11, 2002

(51) Int. Cl.
*H04Q 7/20* (2006.01)
*H04M 1/00* (2006.01)

(52) U.S. Cl. .................... 455/525; 455/524; 455/562.1
(58) Field of Classification Search ................ 455/419, 455/432, 435.1, 445, 434, 436, 535.2, 42.1, 455/425, 525, 524, 562.1
See application file for complete search history.

(56) References Cited

U.S. PATENT DOCUMENTS

| | | | | |
|---|---|---|---|---|
| 4,750,198 A | * | 6/1988 | Harper | 455/434 |
| 5,428,666 A | * | 6/1995 | Fyfe et al. | 455/551 |
| 5,504,803 A | * | 4/1996 | Yamada et al. | 455/426.1 |
| 5,517,673 A | * | 5/1996 | Fehnel | 455/434 |
| 5,621,784 A | * | 4/1997 | Tiedemann et al. | 455/435.1 |
| 5,809,419 A | * | 9/1998 | Schellinger et al. | 455/434 |
| 5,819,174 A | * | 10/1998 | Kyllonen | 455/425 |
| 5,982,758 A | * | 11/1999 | Hamdy | 370/331 |
| 6,044,265 A | * | 3/2000 | Roach, Jr. | 455/419 |
| 6,085,087 A | * | 7/2000 | Hori et al. | 455/434 |
| 6,483,824 B1 | * | 11/2002 | Ault | 370/332 |
| 6,850,506 B1 | * | 2/2005 | Holtzman et al. | 370/335 |
| 2002/0025801 A1 | * | 2/2002 | Yang | 455/416 |
| 2003/0235180 A1 | * | 12/2003 | Oprescu-Surcobe et al. | 370/348 |
| 2004/0005883 A1 | * | 1/2004 | Lee | 455/422.1 |

* cited by examiner

*Primary Examiner*—Tilahun B Gesesse
(74) *Attorney, Agent, or Firm*—K&L Gates

(57) ABSTRACT

Provided is a mobile apparatus for use in a wireless cellular-based communication system. The apparatus includes means for conducting a wireless cellular-based call (e.g., a packet data call) by communicating with a first base station means for automatically performing the following steps in response to a completion of the wireless cellular-based call: (i) storing overhead information specifically pertaining to the first base station; (ii) selecting a second base station with which to communicate, based on a comparison of plural available base stations; (iii) determining whether the second base station is identical to the first base station; and (iv) utilizing the stored overhead information for communicating with the second base station if and only if the second base station is identical to the first base station.

18 Claims, 3 Drawing Sheets

APPARATUS FOR IMPROVING CALL TRANSITION EFFICIENCY IN A WIRELESS COMMUNICATION SYSTEM

BACKGROUND OF THE INVENTION

1. Field of the Invention

The present invention concerns state transitions by a mobile device in a wireless cellular-based communications system, and more particularly concerns transitions to an idle, or base-station-monitoring, state upon completion of a packet data call.

2. Description of the Related Art

Various techniques exist for cellular-based wireless communications systems. Such techniques include code division multiple access (CDMA), time division multiple access (TDMA) and frequency division multiple access (FDMA), as well as techniques which employ different combinations of such multiplexing.

In addition to the basic technology employed, various standards exist for accomplishing mobile wireless communications in a cellular-based system. One example of such standards is IS2000A which provides for voice and data communications in a CDMA environment. According to the IS2000A standard, the mobile unit (e.g., wireless telephone, personal digital assistant or other wireless device) operates in a number of different states in order to perform all tasks related to the desired communications. This is illustrated in FIG. 1.

As shown in FIG. 1, processing begins in power-up state 10 after a user switches on the power for the mobile unit, such as by pressing a power key. Power up may involve preliminary tasks, such as setting registers.

Next, the mobile unit goes into an initialization state 12. In this state, the mobile unit selects a base station to use. Generally, this is accomplished by scanning for signals from nearby base stations and selecting the strongest signal. As a result of this selection, the pilot signal for the base station is acquired. Then, the synchronization information for such base station is acquired, and the mobile unit adjusts its timing so as to synchronize with the selected base station.

Once a base station has been selected in initialization state 12, the mobile unit enters idle state 14 in which the mobile unit monitors the base station, waiting to receive certain overhead information regarding the base station, and then uses such information to calculate channel parameters. According to the IS2000A standard, the base station is only required to transmit its overhead information every 1.28 seconds. Once such overhead information has been received and the channel parameters have been calculated, the mobile unit monitors the base station for an incoming call and also waits for any call that might be initiated by the user. In either case, such calls may be voice calls, i.e., conventional telephone calls. Alternatively, such calls may be data calls, such as calls to send or to receive e-mail or other short text messages or calls to request or to transmit Web pages.

Thus, at the same time that the mobile unit is waiting for a base station request to initiate a call, it also waits for an input from the user to initiate a call. Such user input might include, for example, entry of a telephone number and pressing of a "send" key, or else might include designation of a Web page, or wireless markup language (WML) page, link. It is noted that a user-initiated call may be directly requested by the user or initiated automatically based on a user action. In fact, multiple calls may be automatically initiated by a single user action.

In the access state 16, a request for a call has been received by the mobile unit, either from the base station or from a user, and processing is performed to initiate the call. Such processing typically will include communication of the channel to be used for forward link communications (i.e., from the base station to the mobile unit) and/or communication of a channel to be used for reverse link communications (i.e., from the mobile unit to the base station).

In traffic channel state 18, the call is conducted (e.g., by transmitting packet data or by communicating two-way voice data). Upon completion of the call 18, the previously acquired overhead information is cleared and processing returns to step 12 in order to again acquire a base station to monitor. This return to the initialization state conventionally is considered necessary because the best base station to monitor might have changed during the call.

SUMMARY OF THE INVENTION

The present inventor has discovered that the prior art technique of returning to the initialization state 12 upon completion of a call 18 often will require undue delay between calls, such as up to 1.68 seconds from the end of one call to the beginning of the next. While this may not be too significant with respect to voice calls, the present inventor has recognized that current and future data communications often will require a fast sequence of packet data calls. In this context, such a long period of delay between calls will significantly impede performance.

The present invention addresses this need (i) by storing overhead information pertaining to a base station upon completion of a call for use if the same base station is reacquired and/or (ii) by directly returning to an idle state upon completion of a call. As a result, faster transitions typically can be accomplished between calls.

Thus, in one aspect the invention is directed to a mobile apparatus for use in a wireless cellular-based communication system. The apparatus conducts a wireless cellular-based call (e.g., a packet data call) by communicating with a first base station and automatically performs the following steps in response to a completion of the wireless cellular-based call:

(i) storing overhead information specifically pertaining to the first base station (e.g., any or all of a search window, an available channel, a frequency to use and a pseudo-random noise (PN) code offset);

(ii) selecting a second base station with which to communicate, based on a comparison of plural available base stations (e.g., based on signal power);

(iii) determining whether the second base station is identical to the first base station; and (iv) utilizing the stored overhead information for communicating with the second base station (e.g., by calculating channel parameters based on the stored overhead information and then monitoring transmissions from the second base station for incoming calls) if and only if the second base station is identical to the first base station.

By storing overhead information in the foregoing manner, the present invention can provide for faster transitions between wireless calls, which can be particularly important for packet data calls. In a more particularized aspect of the invention, the mobile apparatus operates according to an IS2000 Wireless Standard that includes an Initialization state and an Idle state, and step (ii) above is performed in the Initialization state. In a further particularized aspect, a determination is made as to how current the stored overhead information is, and utilization of the stored overhead information for communicating with the second base station is conditioned on how current it is, such as by not using the stored overhead information if it is more than approximately 10 minutes old.

In another aspect, the invention is directed to a mobile apparatus for use in a wireless cellular-based communication system. The apparatus monitors transmissions from a first base station for incoming calls (e.g., packet data calls) by using base-station information (e.g., any or all of a search window, an available channel, a frequency to use and a pseudo-random noise (PN) code offset) that is specific to the first base station. A wireless cellular-based call is then conducted by communicating with the first base station. In response to a completion of the wireless cellular-based call, monitoring of transmissions from the first base station for incoming calls is directly resumed (i.e., without first acquiring a base station) by using the base-station information for the first base station (e.g., without clearing such information).

By directly returning to monitoring transmissions in the foregoing manner, the present invention can allow for much faster transitions between calls, which can be particularly important for packet data calls. In a more particularized aspect of the invention, in response to the completion of the wireless cellular-based call a determination is made as to how current the base-station information is and the direct resumption of monitoring transmissions from the first base station is conditioned on how current such information is. For example, in certain embodiments the mobile apparatus does not directly resume monitoring transmissions from the first base station if the base-station information is more than approximately 10 minutes old.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

The present inventor has analyzed the delay between completion of a call and resumption of base station monitoring in the idle state 14 in a typical conventional IS2000A implementation. Generally, the period of time spent by the mobile unit in the initialization state is approximately 320 milliseconds (ms). Thereafter, another 600 milliseconds on average to a maximum of 1.28 seconds is spent waiting to acquire the base station's overhead parameters in the idle state. This is because the IS2000A standard only requires the base station to transmit such overhead information every 1.28 seconds. Access time for a new call, under ideal conditions, typically is approximately 80 milliseconds. Accordingly, the total time between calls, on average, is approximately:

$$\text{total time} = 320 \text{ ms} + 600 \text{ ms} + 80 \text{ ms} = 1 \text{ second} \qquad \text{(Eq. 1)}$$

However, as indicated above, in the worst-case situation, this delay can be up to 1.68 seconds. Such a long delay, particularly with respect to packet data calls, usually will be unacceptable to an end user.

Although the same problem is present for voice calls, voice calls tend to be less frequent and normally will last a few minutes or longer. On the other hand, due to the bursty nature of packet data, each call connection might last just a few seconds, but with many more calls occurring within a given period of time. As a result, using conventional techniques a substantial percentage of the time spent in making and receiving packet data calls will be spent transitioning between such calls.

First Embodiment

Figure 1:
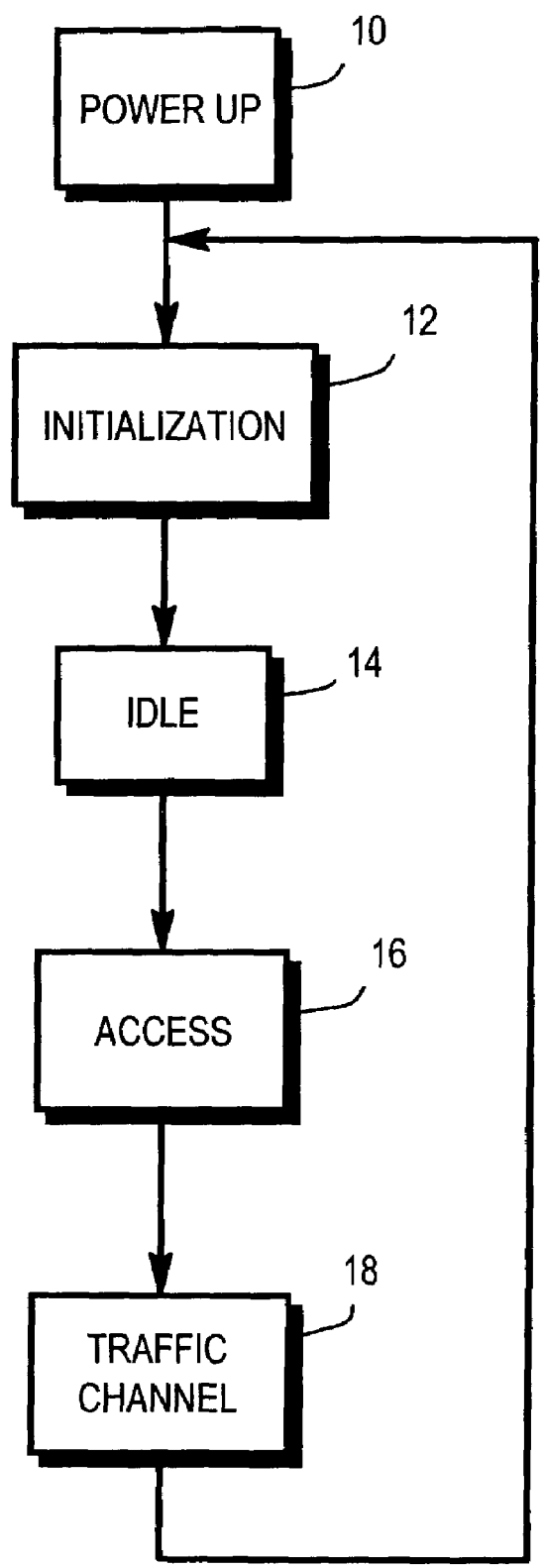
FIG. 1 is a flow diagram showing conventional state transitions by a mobile unit in a wireless cellular-based communication system.
Figure 2:
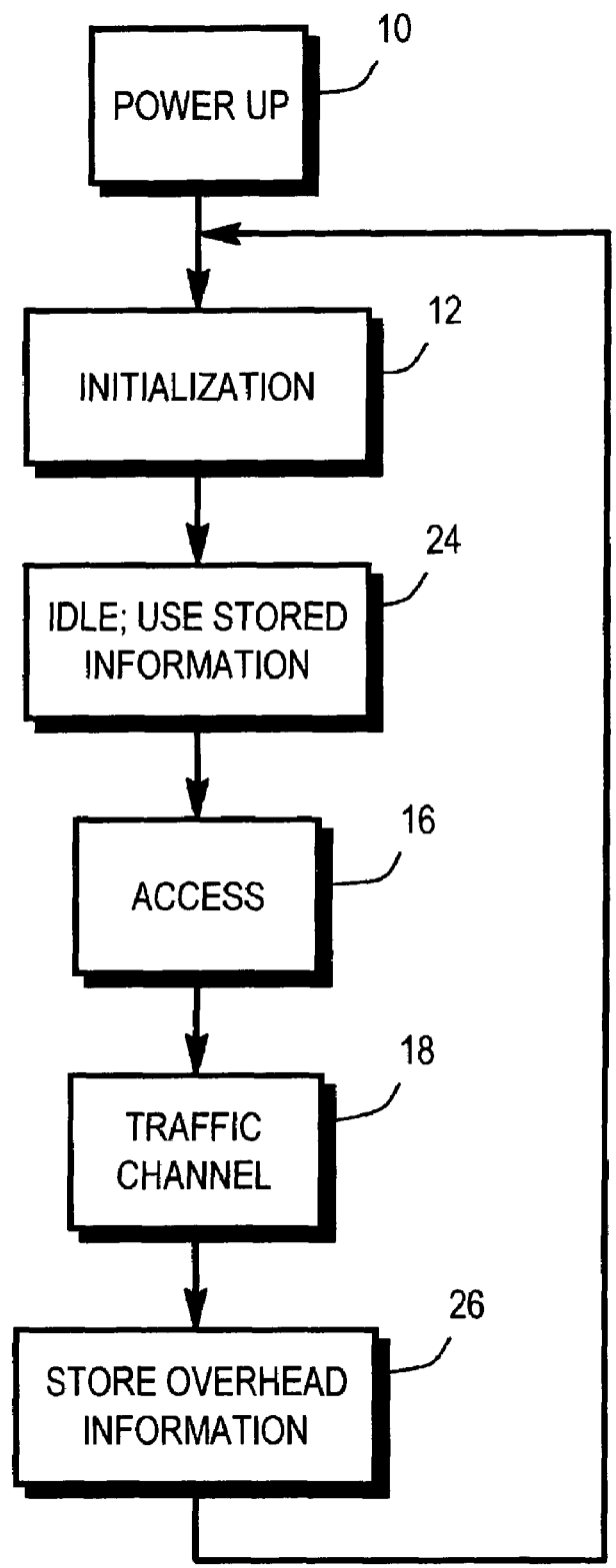
FIG. 2 is a flow diagram showing state transitions by a mobile unit in a wireless cellular-based communication system according to a first representative embodiment of the present invention.

A technique for reducing such transition time is illustrated in FIG. 2 and discussed below. The mobile unit operational states shown in FIG. 2 that have the same reference numbers as the corresponding operational states shown in FIG. 1 are not materially different than such corresponding conventional operational states. Accordingly, in certain cases no additional detail regarding such operational states is set forth below.

In this embodiment of the invention, the mobile unit is powered up in operational state 10 and then acquires a base station and synchronizes its timing to the acquired base station in initialization state 12. Thereafter processing proceeds to idle state 24.

In the preferred embodiment of the invention, the first invocation of idle state 24 after power-up state 10 is identical to idle state 14 described above. That is, on this first invocation the base station's overhead parameters (e.g., specific to the current base station) are acquired and the mobile unit waits for either a base station request or a user input indicating the initiation of a call. The acquired overhead parameters typically will include: an available channel, a frequency to use, search windows, and/or a pseudo-random noise (PN) code offset for the base station and/or other base stations to monitor for soft handoff purposes. Based on the acquired overhead information, channel parameters (e.g., for the paging and/or broadcast channels) are calculated (e.g., using conventional techniques).

As used herein, a "call" refers to a discrete communication session, which may be one-way or two-way. A call may be a standard voice telephone call involving two-way voice communication and/or a data call (e.g., packet data) that involves any audio or non-audio digital data transfers, such as may be used for text messaging, Web page requests and/or Web page downloads, or any other data transfers to and/or from the user of the mobile unit. In either case, the data are transmitted in a digital format. It is noted that the term "data calls" typically will not include data transfers for the sole purpose of ensuring proper operation of the mobile unit or proper communication between the mobile unit and the base station (such as power control feedback transmissions). Rather, "calls" are intended to encompass communication sessions that are for the primary purpose of communicating data to and/or from the end user of the mobile unit.

The acquired overhead information and calculated channel parameters then are used to communicate with the base station. This preferably includes monitoring the base station for incoming calls (still in idle state 24), as well as sending information to and receiving information from the base station during a call.

In access state 16, as described above, the mobile unit sends a request to, or responds to a request from, the base station to initiate a call. Then, in traffic channel state 18 the call is conducted. However, unlike the conventional technique, upon completion of the call 18 processing proceeds to step 26.

In step 26, the overhead information for the current base station is stored into the mobile unit's memory. When such overhead information has been stored 26, processing returns to initialization state 12.

Once again, in state 12 the mobile unit acquires a base station and synchronizes its timing to that base station. Next, the mobile unit enters idle state 24.

As noted above, idle state 24 differs depending upon whether it is invoked for the first time after power-up state 10 or whether it is invoked after completion of a call 18 and subsequent re-initialization 12. In this latter case, overhead information for the base station with which the mobile unit communicated during the prior call was stored in the mobile unit's memory in step 26. Accordingly, rather than having to wait for a broadcast of the base station's overhead information, in certain circumstances the base station reuses the stored overhead information (and/or the previously calculated channel parameters based thereon). In the preferred embodiment of the invention, such stored overhead information is used if and only if: (i) the base station acquired in the immediately preceding initialization state 12 is the same as was used for the previous call and (ii) such overhead information is not too old (e.g., not more than approximately 10 minutes old). However, any other criteria may instead be used to determine whether the mobile unit utilizes the stored overhead information or waits for a new broadcast from the acquired base station. The stored overhead information is used to communicate with the base station, e.g., in the same manner described above.

By eliminating the need to acquire overhead information from the base station, the foregoing embodiment of the invention can eliminate the 600-millisecond average (1.28 second maximum) wait time during the idle state. Thus, when such stored overhead information may be used the average transition time can be reduced from approximately 1 second to approximately 400 milliseconds.

It is noted that the base station might change its overhead information within the 10-minute window (or such other maximum time frame used in idle state 24). However, field results indicate that base stations rarely change their overhead information more frequently than every 10 minutes.

Second Embodiment

Figure 3:
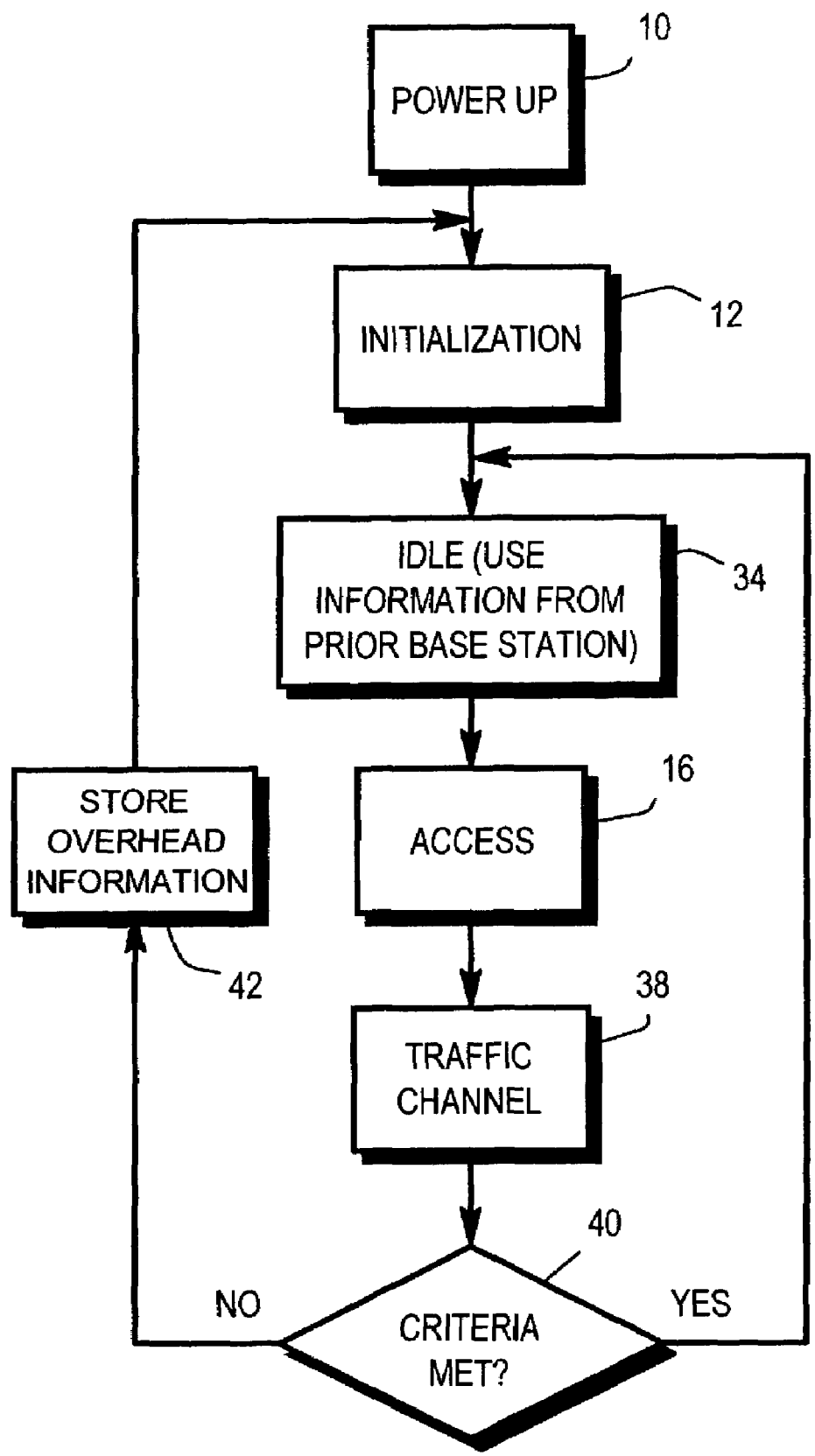
FIG. 3 is a flow diagram showing state transitions by a mobile unit in a wireless cellular-based communication system according to a second representative embodiment of the present invention.

FIG. 3 illustrates an alternate embodiment of the present invention. As shown in FIG. 3, the mobile unit performs power-up state 10 and then initialization state 12, as described above. The initial invocation of idle state 34 after power-up is not materially different than idle state 14 or the initial invocation of idle state 24 after power-up. Then, a voice or data call is accessed 16, as described above.

Traffic channel state 38 is different than traffic channel state 18 described above in that in operational state 38 the overhead information is not cleared upon termination of the call. Rather, after termination of the call processing proceeds to step 40.

In step 40, a determination is made as to whether certain specified criteria have been met. Preferably, such criteria are directed to determining whether it would be advisable to return directly to monitoring the base station in idle state 34 without clearing the base station's overhead information. In this regard, It is noted that transition directly back to idle state 34 might not be optimal in a very dynamic radio environment, such as if the mobile unit is moving significantly and/or is located in an urban environment or any other environment having a high concentration of base stations (i.e., small cells). In other words, such a direct transition might be disadvantageous where movement of the mobile unit is large relative to cell size. Thus, the criteria might include a determination as to whether movement of the mobile unit exceeds a specified threshold that is based upon an indication of cell size received from the base station. In addition, or instead, the criteria might include a determination as to whether the overhead information is older than a specified maximum (e.g., older than approximately 10 minutes).

If the criteria are satisfied in step 40, processing returns directly to idle state 34 without clearing the overhead information. In other words, after completion of a call initialization state 12 is bypassed as compared to the conventional technique. In idle state 34 (i.e., invocations thereof after completion of a call), the mobile unit directly proceeds to monitoring the same base station with which the mobile unit communicated during the preceding call, in order to await receipt of a new call. Because the prior overhead information was not cleared, such direct monitoring is possible without the necessity of acquiring new overhead information or calculating new channel parameters based thereon. Also, in this invocation of idle state 34 the mobile unit waits for any user input indicating user-initiation of a call.

On the other hand, if the criteria in step 40 were not satisfied, then processing proceeds to step 42 in which the overhead information is stored in memory. Thereafter, processing returns to initialization state 12, in which a new base station is acquired. The subsequent invocation of idle state 34 then is similar to the second and subsequent invocations of idle state 24 (shown in FIG. 2). That is, the stored overhead information is used, for example, if only if the same base station was acquired in initialization state 12 and the other criteria for using the stored overhead information (e.g., the stored overhead information is not too old) are satisfied. Otherwise, new overhead information is acquired from the current base station.

Referring to Eq. 1 above, it can be seen that this embodiment of the invention can reduce the transition time between calls to 80 milliseconds on average (when transitioning directly back to idle after completion of a call), as compared with 1 second on average for the conventional technique. This represents a savings of 92 percent. Such benefits are achieved by directly resuming base station monitoring after completion of a call without the necessity of acquiring a base station, acquiring the overhead information for the base station or calculating channel parameters based on such overhead information.

It is noted that in the embodiment described above, if the determination in step 40 is negative the overhead information is stored in step 42, and the subsequent invocation of idle state 34 is similar to idle state 24 in the first embodiment. However, in a variation of the present embodiment the overhead information instead is simply cleared in step 42, and the subsequent invocation of idle state 34 is similar to idle state 14 in the conventional technique.

System Environment.

As indicated above, many of the methods and techniques described herein can be practiced using a standard mobile wireless device, such as a wireless telephone, a personal digital assistant (PDA), or any other wirelessly networked appliance or device. Such a device typically will include, for example, at least some of the following components: one or more central processing units (CPUs), read-only memory (ROM), random-access memory (RAM), input/output circuitry for interfacing with other devices and/or for connecting to one or more networks (which in turn may connect to the Internet or to any other networks), a display (such as a liquid crystal display), other output devices (such as a speaker), one or more input devices (such as a keypad, a microphone, a stylus and touch-sensitive screen, or any other pointing device), a real-time clock, and a modem (which also may connect to the Internet or to any other computer network). In operation, the process steps to implement the above methods typically are stored in RAM or ROM and then executed by the CPU directly out of such RAM or ROM.

Suitable devices for use in implementing the present invention may be obtained from various vendors. Various types of devices may be used, depending upon the size and complexity of the tasks. In addition to the small wireless devices described above, the techniques of the present invention may be implemented on various larger computers, such as mainframe computers, multiprocessor computers, workstations, laptops or any other personal computers. Such larger devices typically will have a mass storage device, such as a hard drive, and the computer-executable steps of the present invention typically will be stored on such mass storage device, downloaded into RAM, and then executed out of RAM. Any of the functionality described above can be implemented in software, hardware, firmware or any combination of these, with the particular implementation being selected based on known engineering tradeoffs.

It also should be understood that the present invention encompasses machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Additional Considerations.

In the foregoing embodiments of the invention, overhead information is stored for a single base station. The present invention also contemplates storing overhead information for multiple base stations, thereby avoiding the necessity of having to receive such overhead information for any of the base stations whose information is stored (e.g., provided in each case that the stored information is not too old). This variation on the above embodiments is particularly useful where the acquired base station is expected to change frequently.

The foregoing techniques are particularly applicable in connection with the IS2000 standard. However, it should be noted that they are not limited to IS2000 implementations.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A mobile apparatus for use in a wireless cellular-based communication system, said apparatus comprising:
   (a) means for conducting a wireless cellular-based call by communicating with a first base station; and
   (b) means for automatically performing the following steps in response to a completion of the wireless cellular-based call:
      (i) storing overhead information specifically pertaining to the first base station;
      (ii) selecting a second base station with which to communicate, based on a comparison of plural available base stations;
      (iii) determining whether the second base station is identical to the first base station; and
      (iv) utilizing the stored overhead information for communicating with the second base station if and only if the second base station is identical to the first base station.

2. A mobile apparatus for use in a wireless cellular-based communication system, said apparatus comprising:
   (a) means for conducting a wireless cellular-based call by communicating with a first base station; and
   (b) means fox automatically performing the following steps in response to a completion of the wireless cellular-based call;
      (i) storing overhead information specifically pertaining to the first base station;
      (ii) selectin a second base station with which to communicate, based on a comparison of plural available base stations;
      (iii) determining whether the second base station is identical to the first base station; and
      (iv) utilizing the stored overhead information for communicating with the second base station if and only if the second base station is identical to the first base station, wherein said mobile apparatus operates according to an IS2000 Wireless Standard that includes an Initialization state and an idle state, and wherein said step (ii) is performed in the Initialization state.

3. A mobile apparatus according to claim 2, wherein the overhead information includes at least two of: a search window, an available channel, a frequency to use and a pseudo-random noise (PN) code offset.

4. A mobile apparatus according to claim 2, wherein the overhead information includes a pseudo-random noise (PN) code offset.

5. A mobile apparatus according to claim 2, wherein the overhead information includes a frequency to use.

6. A mobile apparatus according to claim 2, wherein said means (b) further performs the following steps in response to the completion of the wireless cellular-based call: determining how current the stored overhead information is; and conditioning utilization of the stored overhead information for communicating with the second base station in step (iv) on how current the stored overhead information is.

7. A mobile apparatus according to claim 6, wherein the overhead information is not used if more than approximately 10 minutes old.

8. A mobile apparatus according to claim 2, wherein said step (ii) comprises selecting from among the plural base stations based on signal power.

9. A mobile apparatus according to claim 2, wherein the wireless cellular-based call is a packet data call.

10. A mobile apparatus according to claim 2, wherein utilizing the stored overhead information in step (iv) comprises calculating channel parameters based on the stored overhead information.

11. A mobile apparatus according to claim 2, wherein the communicating in step (iv) comprises monitoring transmissions from the second base station for incoming calls.

12. A mobile apparatus for use in a wireless cellular-based communication system, said apparatus comprising:
  (a) means for monitoring transmissions from a first base station for incoming calls, said monitoring being performed by using base-station information that is specific to the first base station;
  (b) means for conducting a wireless cellular-based call by communicating with the first base station; and
  (c) means for directly resuming the monitoring of transmissions from the first base station for incoming calls, said monitoring being performed by using the base-station information for the first base station, in response to a completion of the wireless cellular-based call,
  wherein said mobile apparatus does not clear the base-station information upon completion of the wireless cellular-based call,
  wherein the base-station information includes at least two of: a search window, an available channel, a frequency to use and a pseudo-random noise (PN) code offset.

13. A mobile apparatus according to claim 12, wherein the base-station information includes a pseudo-random noise (PN) code offset.

14. A mobile apparatus according to claim 12, wherein the base-station information includes a frequency to use.

15. A mobile apparatus according to claim 12, wherein said means (c) further performs the following steps in response to the completion of the wireless cellular-based call: determining how current the base-station information is; and conditioning the directly resuming monitoring of transmissions from the first base station by said means (c) on how current the base-station information is.

16. A mobile apparatus according to claim 15, wherein said mobile apparatus does not directly resume monitoring transmissions from the first base station by said means (c) if the base-station information is more than approximately 10 minutes old.

17. A mobile apparatus according to claim 12, wherein the wireless cellular-based call is a packet data call.

18. A mobile apparatus according to claim 12, wherein said mobile apparatus operates according to an IS2000 Wireless Standard that includes an Initialization state and an idle state, and wherein said means (c) directly returns to the idle state upon completion of the wireless cellular-based call.

* * * * *